(12) United States Patent
Kumano et al.

(10) Patent No.: US 11,285,957 B2
(45) Date of Patent: Mar. 29, 2022

(54) TRAVELING CONTROL APPARATUS, TRAVELING CONTROL METHOD, AND NON-TRANSITORY COMPUTER-READABLE STORAGE MEDIUM STORING PROGRAM

(71) Applicant: HONDA MOTOR CO., LTD., Tokyo (JP)

(72) Inventors: Takayasu Kumano, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

(21) Appl. No.: 16/823,270

(22) Filed: Mar. 18, 2020

(65) Prior Publication Data
US 2020/0307598 A1   Oct. 1, 2020

(30) Foreign Application Priority Data
Mar. 25, 2019   (JP) ............................. JP2019-057023

(51) Int. Cl.
*B60W 40/04*   (2006.01)
*G08G 1/16*    (2006.01)
(Continued)

(52) U.S. Cl.
CPC .... *B60W 30/18163* (2013.01); *B60W 30/162* (2013.01); *B60W 40/04* (2013.01);
(Continued)

(58) Field of Classification Search
CPC ......... B60W 30/18163; B60W 30/162; B60W 40/04; B60W 2554/4041;
(Continued)

(56) References Cited

U.S. PATENT DOCUMENTS 10,131,306 B2  11/2018 Takae et al.
10,351,137 B2   7/2019 Shin
(Continued)

FOREIGN PATENT DOCUMENTS

JP   2014-019332 A    2/2014
WO   2017/141765      8/2017
WO   WO-2018163349 A1 * 9/2018 ............... G08G 1/09

OTHER PUBLICATIONS

English_Translation_WO2018163349A1 (Year: 2018).*

(Continued)

*Primary Examiner* — Peter D Nolan
*Assistant Examiner* — Ashley L Redhead, Jr.
(74) *Attorney, Agent, or Firm* — Thomas | Horstemeyer, LLP

(57) ABSTRACT

An estimation unit, if an acquisition unit acquires, as information outside a vehicle, information of a following other vehicle that is a vehicle traveling on a lane different from a traveling lane of the vehicle and is traveling behind the vehicle and information of a preceding other vehicle that is traveling ahead the vehicle and the following other vehicle, estimates, based on a behavior of the following other vehicle to the preceding other vehicle and a behavior of the following other vehicle to the vehicle, whether the behavior of the following other vehicle allows a lane change of the vehicle to enter between the preceding other vehicle and the following other vehicle.

11 Claims, 12 Drawing Sheets

(51) Int. Cl.
  *B60W 30/18* (2012.01)
  *B60W 30/16* (2020.01)
  *G06K 9/00* (2022.01)

(52) U.S. Cl.
  CPC .......... *G06K 9/00825* (2013.01); *G08G 1/167* (2013.01); *B60W 2554/4041* (2020.02); *B60W 2554/802* (2020.02); *B60W 2554/804* (2020.02)

(58) Field of Classification Search
  CPC ...... B60W 2554/802; B60W 2554/804; G06K 9/00825; G06K 9/00798; G08G 1/167; B62D 15/0255; B62D 15/025
  See application file for complete search history.

(56) References Cited

U.S. PATENT DOCUMENTS

| | | |
|---|---|---|
| 10,543,840 B2 | 1/2020 | Takeda |
| 10,759,432 B2 | 9/2020 | Takeda |
| 11,136,039 B2 | 10/2021 | Kang |
| 2017/0259819 A1 | 9/2017 | Takeda |
| 2018/0170388 A1 | 6/2018 | Shin |
| 2018/0201272 A1 | 7/2018 | Takeda |
| 2018/0222423 A1 | 8/2018 | Takae et al. |
| 2018/0293894 A1* | 10/2018 | Zhang .................... G01S 17/86 |
| 2018/0348757 A1 | 12/2018 | Mimura et al. |
| 2019/0016339 A1 | 1/2019 | Ishioka |
| 2019/0071075 A1 | 3/2019 | Mimura |
| 2019/0143972 A1 | 5/2019 | Ishioka et al. |
| 2020/0189596 A1 | 6/2020 | Kang |

OTHER PUBLICATIONS

U.S. Appl. No. 16/823,266, filed Mar. 18, 2020 (this is an application that is related to the present application).
U.S. Appl. No. 16/823,272, filed Mar. 18, 2020 (this is an application that is related to the present application).
Office Action for U.S. Appl. No. 16/823,266 dated Sep. 17, 2021.

* cited by examiner

FIG. 9

| FOLLOWING OTHER VEHICLE/ PRECEDING OTHER VEHICLE | | FOLLOWING OTHER VEHICLE/ SELF-VEHICLE | | ESTIMATION RESULT |
|---|---|---|---|---|
| RELATIVE DISTANCE | RELATIVE SPEED | RELATIVE DISTANCE | RELATIVE SPEED | |
| DECREASE | INCREASE | DECREASE | DECREASE | — |
| DECREASE | INCREASE | DECREASE | INCREASE | — |
| DECREASE | INCREASE | INCREASE | DECREASE | — |
| DECREASE | INCREASE | INCREASE | INCREASE | — |
| DECREASE | DECREASE | DECREASE | DECREASE | INTENTION TO GIVE WAY IS ABSENT |
| DECREASE | DECREASE | DECREASE | INCREASE | — |
| DECREASE | DECREASE | INCREASE | DECREASE | — |
| DECREASE/MAINTAIN | DECREASE/MAINTAIN | INCREASE | INCREASE | INTENTION TO GIVE WAY IS ABSENT |
| INCREASE/MAINTAIN | INCREASE/MAINTAIN | DECREASE | DECREASE | INTENTION TO GIVE WAY IS ABSENT |
| INCREASE | INCREASE | DECREASE | INCREASE | — |
| INCREASE | INCREASE | INCREASE | DECREASE | INTENTION TO GIVE WAY IS PRESENT |
| INCREASE | INCREASE | INCREASE | INCREASE | — |
| INCREASE | DECREASE | DECREASE | DECREASE | — |
| INCREASE | DECREASE | DECREASE | INCREASE | — |
| INCREASE | DECREASE | INCREASE | DECREASE | — |
| INCREASE | DECREASE | INCREASE | INCREASE | — |

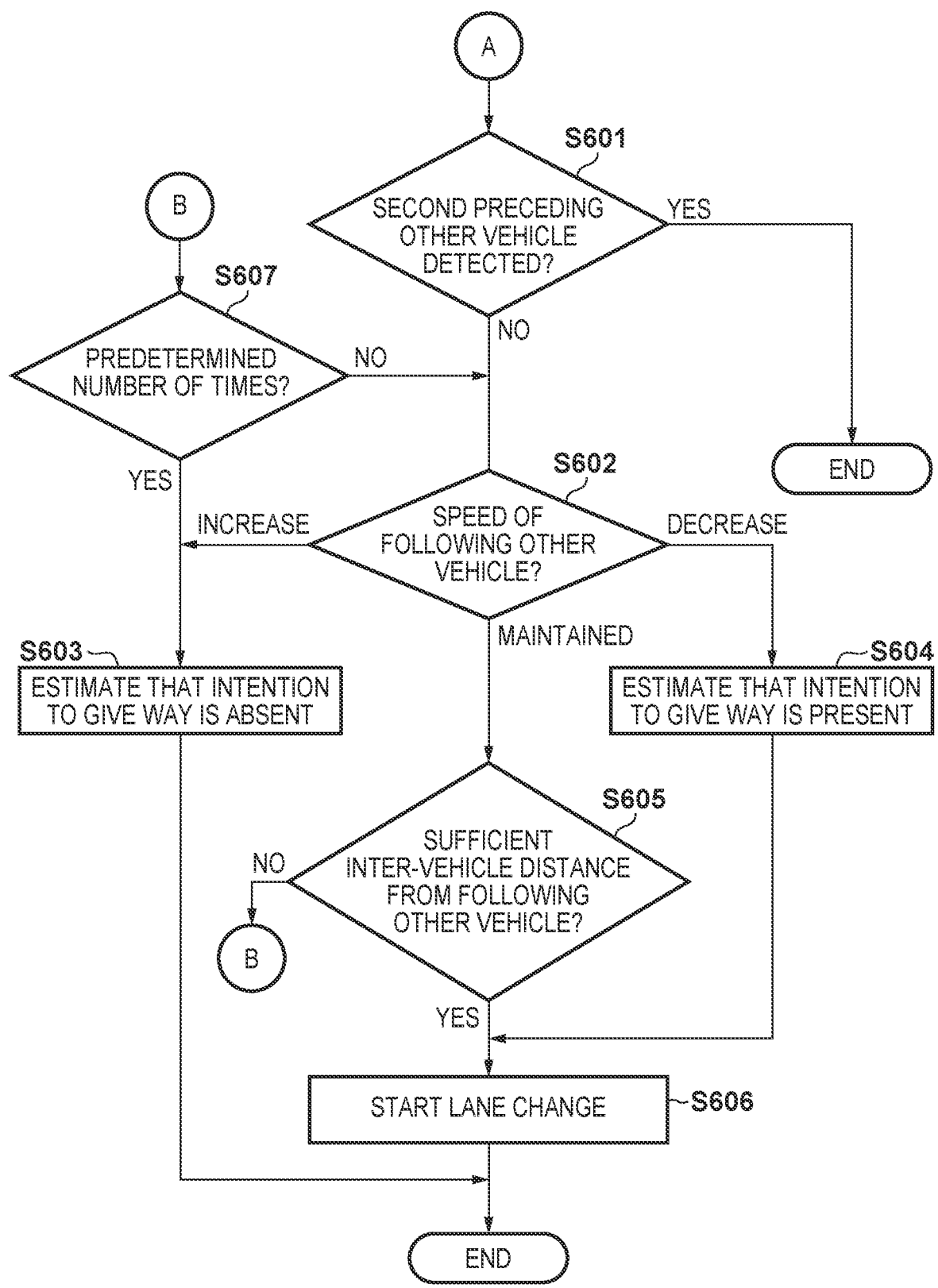

ize the Related Art

TRAVELING CONTROL APPARATUS, TRAVELING CONTROL METHOD, AND NON-TRANSITORY COMPUTER-READABLE STORAGE MEDIUM STORING PROGRAM

CROSS-REFERENCE TO RELATED APPLICATION(S)

This application claims priority to and the benefit of Japanese Patent Application No. 2019-057023 filed on Mar. 25, 2019, the entire disclosure of which is incorporated herein by reference.

BACKGROUND OF THE INVENTION

Field of the Invention

The present invention relates to a traveling control apparatus for controlling traveling of a vehicle, a traveling control method, and a non-transitory computer-readable storage medium storing a program.

Description of the Related Art

One of traveling control processes for controlling traveling of a vehicle is a lane change. Japanese Patent Laid-Open No. 2014-019332 describes detecting the speed of a following vehicle traveling on an adjacent lane and obtaining, based on the speed, a probability that the following vehicle gives the front gap to a self-vehicle.

Japanese Patent Laid-Open No. 2014-019332 shows that the probability that the following vehicle gives the way to the self-vehicle is higher when the speed of the following vehicle is in a low speed range. However, it is not obvious whether the speed reduction of the following vehicle is speed reduction with the self-vehicle in mind, and determination of the behavior of the following vehicle needs to be further improved.

SUMMARY OF THE INVENTION

The present invention provides a traveling control apparatus for more appropriately determining the behavior of a following vehicle, a traveling control method, and a non-transitory computer-readable storage medium storing a program.

The present invention in its first aspect provides a traveling control apparatus comprising: an acquisition unit configured to acquire information outside a vehicle; a control unit configured to control traveling of the vehicle based on the information outside the vehicle, which is acquired by the acquisition unit; and an estimation unit configured to, if the acquisition unit acquires, as the information outside the vehicle, information of a following other vehicle that is a vehicle traveling on a lane different from a traveling lane of the vehicle and is traveling behind the vehicle and information of a preceding other vehicle that is traveling ahead the vehicle and the following other vehicle, estimate, based on a behavior of the following other vehicle to the preceding other vehicle and a behavior of the following other vehicle to the vehicle, whether the behavior of the following other vehicle allows a lane change of the vehicle to enter between the preceding other vehicle and the following other vehicle.

The present invention in its second aspect provides a traveling control method executed by a traveling control apparatus, comprising: acquiring information outside a vehicle; controlling traveling of the vehicle based on the acquired information outside the vehicle; and if information of a following other vehicle that is a vehicle traveling on a lane different from a traveling lane of the vehicle and is traveling behind the vehicle and information of a preceding other vehicle that is traveling ahead the vehicle and the following other vehicle are acquired as the information outside the vehicle, estimating, based on a behavior of the following other vehicle to the preceding other vehicle and a behavior of the following other vehicle to the vehicle, whether the behavior of the following other vehicle allows a lane change of the vehicle to enter between the preceding other vehicle and the following other vehicle.

The present invention in its third aspect provides a non-transitory computer-readable storage medium storing a program configured to cause a computer to function to: acquire information outside a vehicle; control traveling of the vehicle based on the acquired information outside the vehicle; and if information of a following other vehicle that is a vehicle traveling on a lane different from a traveling lane of the vehicle and is traveling behind the vehicle and information of a preceding other vehicle that is traveling ahead the vehicle and the following other vehicle are acquired as the information outside the vehicle, estimate, based on a behavior of the following other vehicle to the preceding other vehicle and a behavior of the following other vehicle to the vehicle, whether the behavior of the following other vehicle allows a lane change of the vehicle to enter between the preceding other vehicle and the following other vehicle.

According to the present invention, it is possible to more appropriately determine the behavior of a following vehicle.

BRIEF DESCRIPTION OF THE DRAWINGS

FIG. 9 is a view showing the association of a relative distance and a relative speed with an estimation result;

FIG. 13 is still another flowchart showing processing of intention estimation.

DESCRIPTION OF THE EMBODIMENTS

Figure 1:
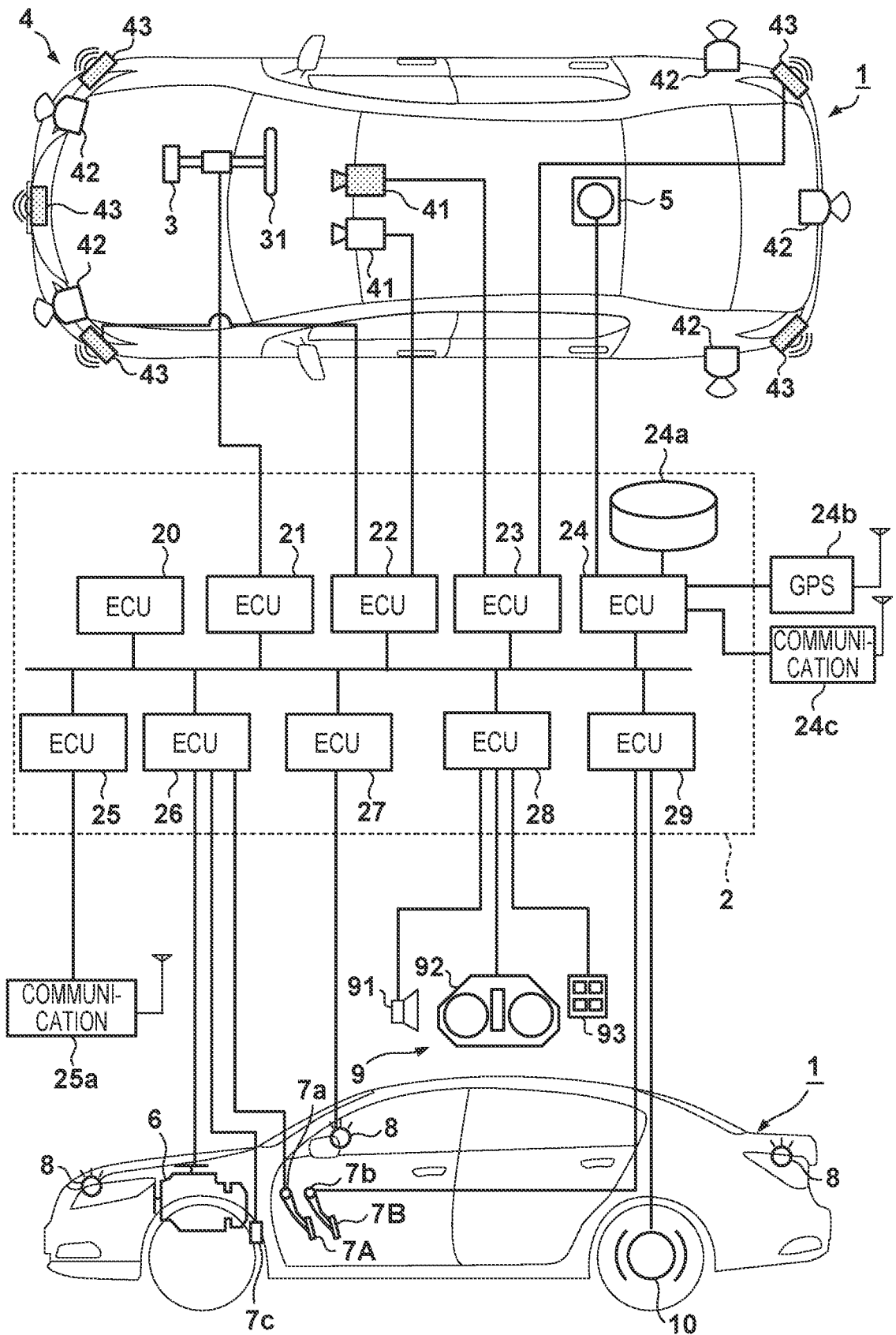
FIG. 1 is a view showing the arrangement of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle control apparatus (traveling control apparatus) according to an embodiment of the present invention, and a vehicle 1 is controlled. FIG. 1 shows the outline of the vehicle 1 by a plan view and a side view. The vehicle 1 is, for example, a sedan-type four-wheeled vehicle.

The control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. In addition, the arrangement of the control apparatus shown in FIG. 1 can be a computer configured to execute the present invention concerning a program.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, for example, the contour of a target or a division line (a white line or the like) of a lane on a road can be extracted.

The detection unit 42 is Light Detection and Ranging (LIDAR), and detects a target around the vehicle 1 or measures the distance to a target. In this embodiment, five detection units 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each detection unit 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information, traffic information, and meteorological information and acquires these pieces of information. The ECU 24 can access a map information database 24a formed in the storage device. The ECU 24 searches for a route from the current position to the destination. Note that databases for the above-described traffic information, meteorological information, and the like may be formed in the database 24a.

The ECU 25 includes a communication device 25a for inter-vehicle communication. The communication device 25a performs wireless communication with another vehicle on the periphery and performs information exchange between the vehicles. The communication device 25a has various kinds of functions, and has, for example, a DSRC (Dedicated Short Range Communication) function and a cellular communication function. The communication device 25a may be formed as a TCU (Telematics Communication Unit) including a transmission/reception antenna.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified. In addition, the display device 92 may include a navigation device.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Control concerning automated driving of the vehicle 1 executed by the ECU 20 will be described. When the driver instructs a destination and automated driving, the ECU 20 automatically controls traveling of the vehicle 1 to the destination in accordance with a guidance route searched by the ECU 24. In the automatic control, the ECU 20 acquires information (outside information) concerning the peripheral state of the vehicle 1 from the ECUs 22 and 23, and controls steering and acceleration/deceleration of the vehicle 1 by issuing instructions to the ECUs 21, 26, and 29 based on the acquired information.

Figure 2:
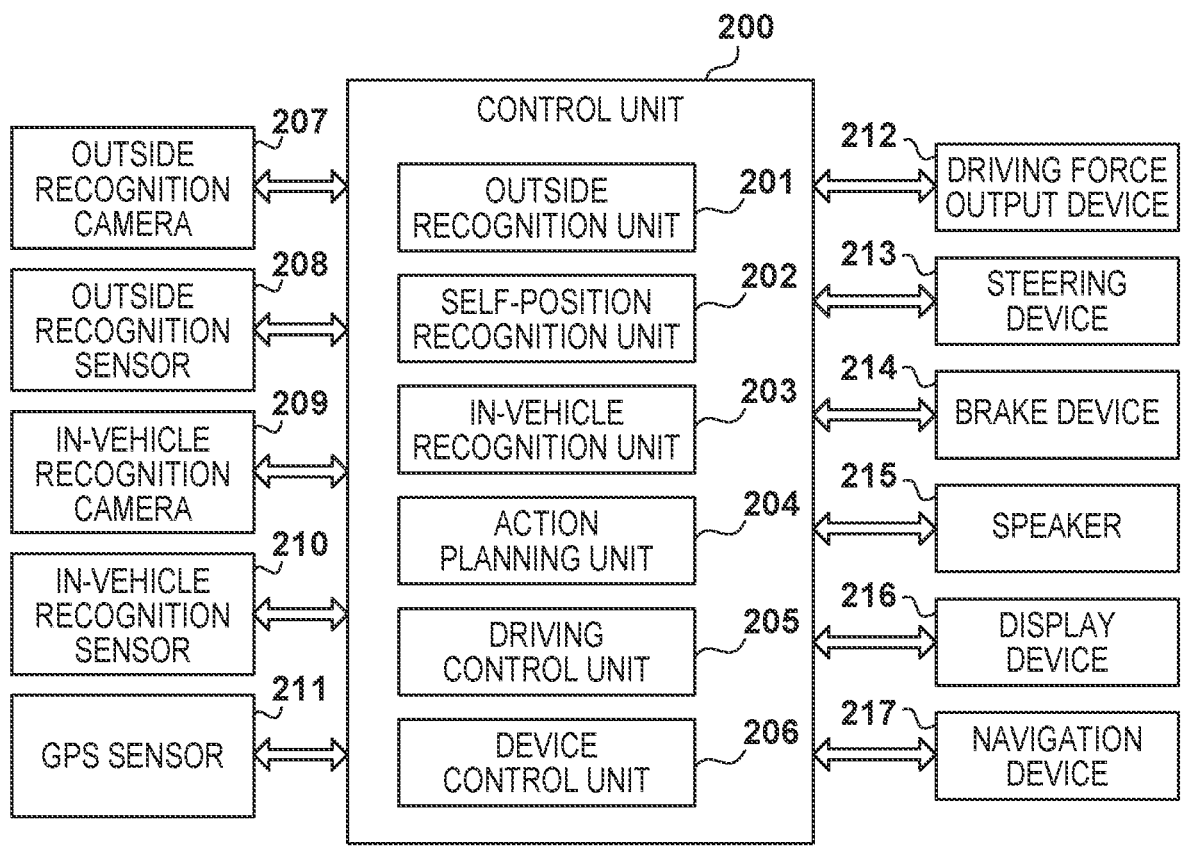
FIG. 2 is a block diagram showing the functional blocks of a control unit.

FIG. 2 is a block diagram showing the functional blocks of the control unit 2. A control unit 200 corresponds to the control unit 2 shown in FIG. 1, and includes an outside recognition unit 201, a self-position recognition unit 202, an in-vehicle recognition unit 203, an action planning unit 204, a driving control unit 205, and a device control unit 206. Each block is implemented by one or a plurality of ECUs shown in FIG. 1.

The outside recognition unit 201 recognizes the outside information of the vehicle 1 based on signals from an outside recognition camera 207 and an outside recognition sensor 208. Here, the outside recognition camera 207 corresponds to, for example, the camera 41 shown in FIG. 1, and the outside recognition sensor 208 corresponds to, for example, the detection units 42 and 43 shown in FIG. 1. The outside recognition unit 201 recognizes, for example, a scene such as an intersection, a railroad crossing, or a tunnel, a free space such as a road shoulder, and the behavior (the speed, the direction of travel, and the like) of another vehicle based on the signals from the outside recognition camera 207 and the outside recognition sensor 208. The self-position recognition unit 202 recognizes the current position of the vehicle 1 based on a signal from a GPS sensor 211. Here, the GPS sensor 211 corresponds to, for example, the GPS sensor 24b shown in FIG. 1.

The in-vehicle recognition unit 203 identifies the occupant of the vehicle 1 based on signals from an in-vehicle recognition camera 209 and an in-vehicle recognition sensor 210 and recognizes the state of the occupant. The in-vehicle recognition camera 209 is, for example, a near infrared camera installed on the display device 92 inside the vehicle 1, and, for example, detects the direction of the sight line of the occupant. In addition, the in-vehicle recognition sensor 210 is, for example, a sensor configured to detect a biological signal of the occupant. The in-vehicle recognition unit 203 recognizes a drowsy state of the occupant, a working state other than driving, or the like based on the signals.

The action planning unit 204 plans an action of the vehicle 1 such as an optimum route or a risk avoiding route based on the results of recognition by the outside recognition unit 201 and the self-position recognition unit 202. The action planning unit 204, for example, performs entering determination based on the start point or end point of an intersection, a railroad crossing, or the like, and makes an action plan based on a prediction result of the behavior of another vehicle. The driving control unit 205 controls a driving force output device 212, a steering device 213, and a brake device 214 based on the action plan made by the action planning unit 204. Here, the driving force output device 212 corresponds to, for example, the power plant 6 shown in FIG. 1, the steering device 213 corresponds to the electric power steering device 3 shown in FIG. 1, and the brake device 214 corresponds to the brake device 10.

The device control unit 206 controls devices connected to the control unit 200. For example, the device control unit 206 controls a speaker 215 to make it output a predetermined voice message such as a message for a warning or navigation. In addition, the device control unit 206 controls a display device 216 to make it display a predetermined interface screen. The display device 216 corresponds to, for example, the display device 92. Additionally, for example, the device control unit 206 controls a navigation device 217 to acquire setting information in the navigation device 217.

The control unit 200 may include a functional block other than those shown in FIG. 2, and may include, for example, an optimum route calculation unit configured to calculate an optimum route to a destination based on map information acquired via the communication device 24c. The control unit 200 may acquire information from a device other than the cameras and the sensors shown in FIG. 2, and may, for example, acquire the information of another vehicle via the communication device 25a. In addition, the control unit 200 receives detection signals not only from the GPS sensor 211 but also from various kinds of sensors provided in the vehicle 1. For example, the control unit 200 receives a detection signal from a door open/close sensor or a door lock mechanism sensor provided in a door portion of the vehicle 1 via an ECU formed in the door portion. The control unit 200 can thus detect unlock of the door or a door opening/closing operation.

Figure 3:
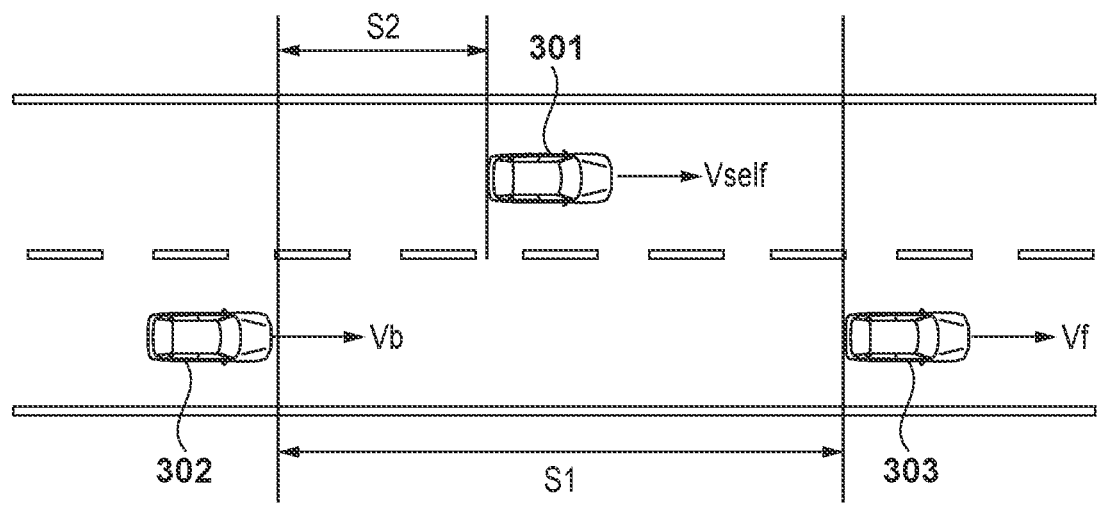
FIG. 3 is a view for explaining an entering operation between vehicles by a lane change.

FIG. 3 is a view for explaining an entering operation between vehicles according to this embodiment. A self-vehicle 301 is a self-vehicle, and a preceding other vehicle 303 and a following other vehicle 302 are traveling on an adjacent lane adjacent to the traveling lane of the self-vehicle in the same direction as the self-vehicle 301. In FIG. 3, the self-vehicle 301 is traveling at a speed Vself, the preceding other vehicle 303 is traveling at a speed Vf, and the following other vehicle 302 is traveling at a speed Vb.

Here, an inter-vehicle distance S1 is the inter-vehicle distance between the preceding other vehicle 303 and the following other vehicle 302, and an inter-vehicle distance S2 is the inter-vehicle distance between the self-vehicle 301 and the following other vehicle 302. Note that in this embodiment, both the inter-vehicle distances S1 and S2 represent distances along the traveling lane.

FIG. 3 shows a scene in which the self-vehicle 301 is going to change the traveling lane toward a target between the preceding other vehicle 303 and the following other vehicle 302. In this embodiment, for example, when the self-vehicle 301 blinks a turn signal for a lane change to show an intention to change the lane, the presence/absence of an intention of the following other vehicle 302 to give the way to the self-vehicle 301 is estimated. For example, even if the self-vehicle 301 has blinked the turn signal, and the following other vehicle 302 has then decelerated, the following other vehicle 302 may have decelerated merely because of the deceleration of the preceding other vehicle 303. In this case, it is estimated that the following other vehicle 302 has no intention to give the way to the self-vehicle 301. In this embodiment, the presence/absence of the intention of the following other vehicle 302 to give the way to the self-vehicle 301 is thus estimated based on the behavior of the following other vehicle 302 to the self-vehicle 301 and the behavior of the following other vehicle 302 to the preceding other vehicle 303. Note that in this embodiment, "give way" is used in a sense of allowing the self-vehicle 301 to change the lane and enter an inter-vehicle region in front of the following other vehicle 302.

Figure 4:
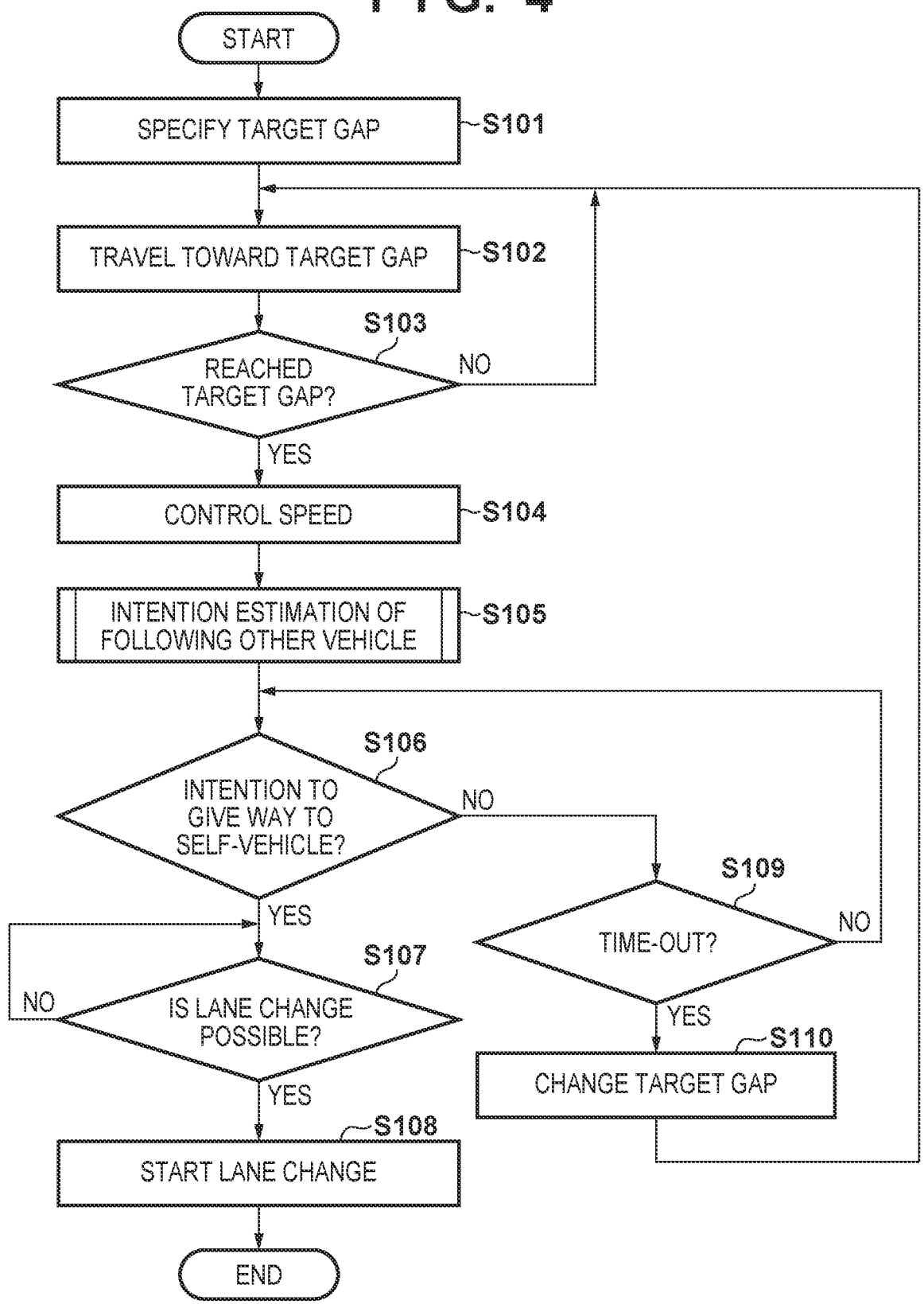
FIG. 4 is a flowchart showing processing of entering between vehicles by a lane change.

FIG. 4 is a flowchart showing processing of entering between vehicles by a lane change by the traveling control apparatus of the self-vehicle 301 according to this embodiment. Processing shown in FIG. 4 is implemented when, for example, the control unit 200 of the self-vehicle 301 reads out a program stored in a storage area such as a ROM and executes it. A description will be made below by referring to the control unit 200 of the self-vehicle 301 simply as the control unit 200 unless specified otherwise.

In step S101, the control unit 200 specifies a target gap to change the lane and enter between vehicles. The target gap corresponds to the inter-vehicle distance S1 in FIG. 3. For example, the control unit 200 specifies the target gap on the front side based on an image capturing result by the outside recognition camera 207. In step S102, the control unit 200 controls traveling of the vehicle 1 to reach a position to run parallel to the target gap specified in step S101.

In step S103, the control unit 200 determines whether the self-vehicle has reached the position to run parallel to the target gap. The process of step S102 is repeated until it is determined that the self-vehicle has reached. Upon determining that the self-vehicle has reached the position to run parallel to the target gap, in step S104, the control unit 200 controls the speed of the self-vehicle 301 to make it match the speed of the following other vehicle 302. The control unit 200 then blinks the turn signal to enter the target gap.

In step S105, the control unit 200 estimates, based on the behavior of the following other vehicle 302 to the self-vehicle 301 and the behavior of the following other vehicle 302 to the preceding other vehicle 303, the presence/absence of the intention of the following other vehicle 302 to give way. The process of step S105 will be described later.

If it is estimated in step S106 as the result of estimation of step S105 that the following other vehicle 302 has an intention to give way to the self-vehicle 301, the control unit 200 advances to step S107. In step S107, the control unit 200 monitors a timing at which a lane change is possible. For example, if the inter-vehicle distance between the following other vehicle 302 and the self-vehicle 301 is a predetermined value or more, the control unit 200 may determine that a lane change is possible. Upon determining that a lane change is possible, in step S108, the control unit 200 starts a lane change to enter the target gap. After that, the processing shown in FIG. 4 is ended.

On the other hand, if it is estimated in step S106 that the following other vehicle 302 has no intention to give way to the self-vehicle 301, in step S109, the control unit 200 determines whether a predetermined time has elapsed, and a time-out has occurred. Upon determining that a time-out has not occurred, processing from step S105 is repeated. On the other hand, upon determining that a time-out has occurred, in step S110, the control unit 200 stops entering the gap currently set to the target, and specifies another target gap. When another target gap is specified, processing from step S102 is repeated.

Figure 5:
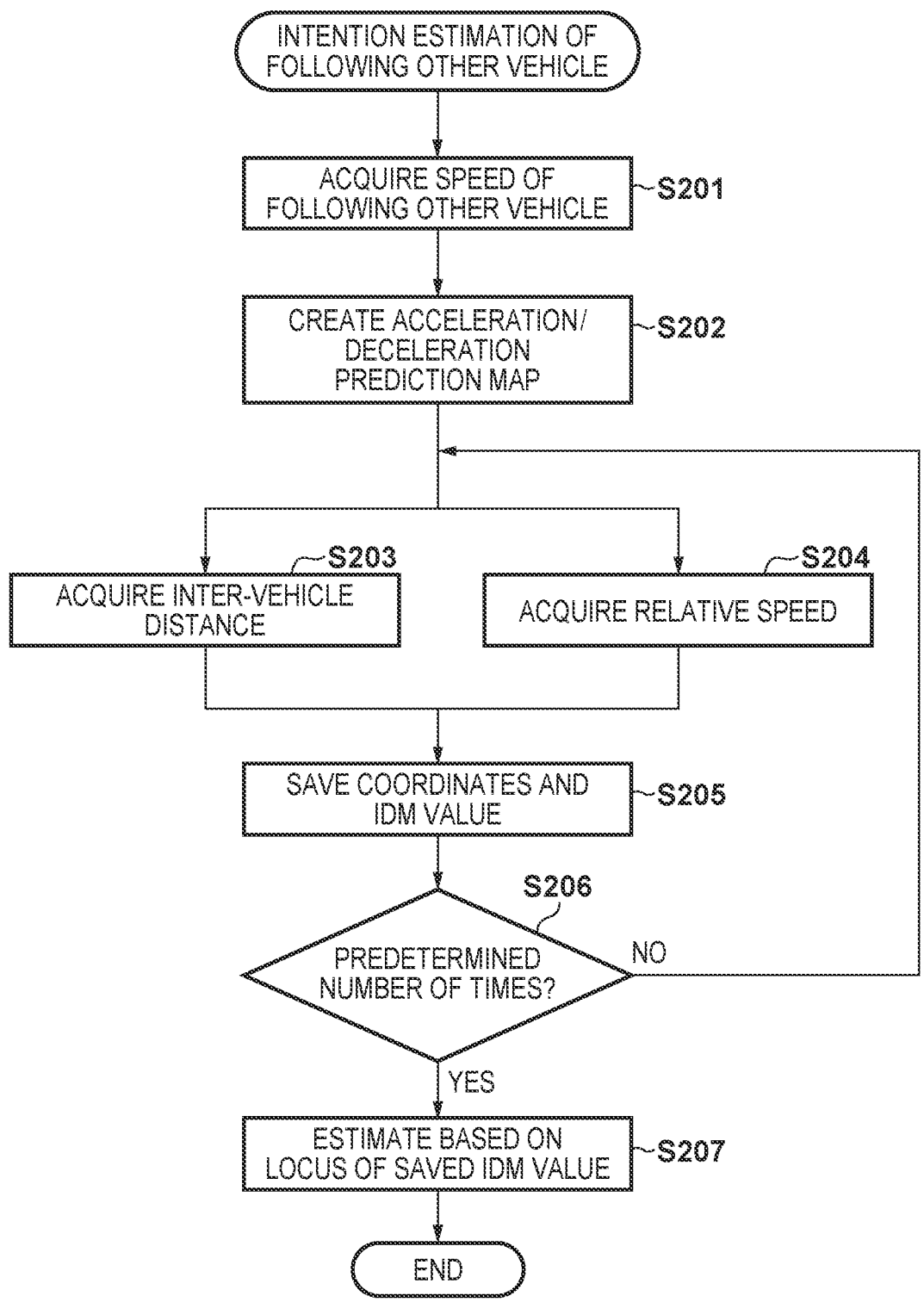
FIG. 5 is a flowchart showing processing of intention estimation.

FIG. 5 is a flowchart showing the process of step S105. In step S201, the control unit 200 acquires the speed of the following other vehicle 302. The control unit 200 acquires the speed of the following other vehicle 302 using, for example, the outside recognition camera 207 or the outside recognition sensor 208. In step S202, the control unit 200 creates an acceleration/deceleration prediction map based on the speed of the following other vehicle 302 acquired in step S201.

Figure 6:
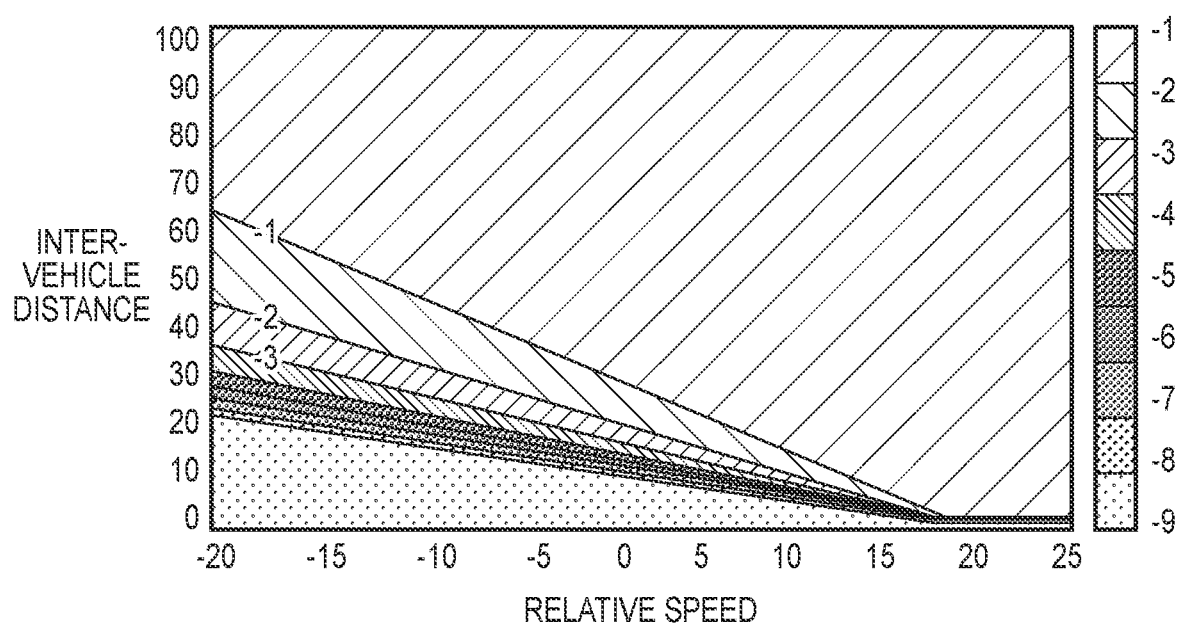
FIG. 6 is a view showing an acceleration/deceleration prediction map.

The acceleration/deceleration prediction map will be described here. FIG. 6 is a view showing an example of the acceleration/deceleration prediction map created in step S202. The acceleration/deceleration prediction map is based on a car-following model (IDM model: Intelligent Driver Model) for two vehicles, that is, a preceding vehicle and a following vehicle. In the IDM model, it is known that an acceleration/deceleration α of a following vehicle, which occurs due to the presence of a preceding vehicle, is given by $$\alpha = a\left[1 - \left(\frac{v}{v_0}\right)^\delta - \left(\frac{s^*(v, \Delta v)}{s}\right)^2\right] \quad (1)$$

where v is the speed of the preceding vehicle, v0 is the speed of the following vehicle, Δv is the relative speed, δ is an exponential constant, s is the inter-vehicle distance, and s* is the effective inter-vehicle distance. The third term of the right side of equation (1) is a term concerning the inter-vehicle distance and the relative speed, and represents the influence from another vehicle. The acceleration/deceleration α is decided based on the influence from the other vehicle. For example, even in a case in which the speed relationship is given by speed of following vehicle>speed of preceding vehicle, and the speed difference is large, if the inter-vehicle distance is short, the following vehicle receives, as an impact, the acceleration/deceleration α calculated from the relative speed and the inter-vehicle distance to obtain an optimum inter-vehicle distance, as can be seen.

The abscissa of FIG. 6 represents the relative speed between two vehicles, and the ordinate represents the inter-vehicle distance between two vehicles. In addition, the acceleration/deceleration α calculated by equation (1) is represented by the difference of hatching in FIG. 6. Note that the acceleration/deceleration α represented by hatching is decided by the absolute speed of the following vehicle. In FIG. 6, the distribution of accelerations/decelerations a of a vehicle is shown, based on the IDM model represented by equation (1), on a space defined by the two axes of the relative speed and the relative distance between two vehicles. Note that the acceleration/deceleration α may be converted into a G value by defining, for example, −2000 mm/s$^2$=−0.2 G.

In this embodiment, on the acceleration/deceleration prediction map created in step S202, the locus of a point corresponding to the relative speed and the inter-vehicle distance between the self-vehicle 301 and the following other vehicle 302 and the locus of a point corresponding to the relative speed and the inter-vehicle distance between the following other vehicle 302 and the preceding other vehicle 303 are determined. The presence/absence of an intention of the following other vehicle 302 to give way is estimated based on the determined loci.

In step S203, the control unit 200 acquires the inter-vehicle distance between the self-vehicle 301 and the following other vehicle 302 and the inter-vehicle distance between the following other vehicle 302 and the preceding other vehicle 303. In step S204, the control unit 200 acquires the relative speed between the self-vehicle 301 and the following other vehicle 302 and the relative speed between the following other vehicle 302 and the preceding other vehicle 303.

In step S205, the control unit 200 plots a first point corresponding to the relative speed and the inter-vehicle distance between the self-vehicle 301 and the following other vehicle 302 on the acceleration/deceleration prediction map created in step S202, and saves the coordinates of the point and an acceleration/deceleration as its IDM value. The IDM value is an example of the predicted acceleration/deceleration value of the following vehicle. In this embodiment, a description will be made using, as an example, an IDM value obtained using the IDM model. Also, in step S205, the control unit 200 plots a second point corresponding to the relative speed and the inter-vehicle distance between the following other vehicle 302 and the preceding other vehicle 303 on the acceleration/deceleration prediction map created in step S202, and saves the coordinates of the point and an acceleration/deceleration as its IDM value.

In step S206, the control unit 200 determines whether the process of step S205 has been executed a predetermined number of times. Upon determining that the process has not been executed a predetermined number of times, the processes of steps S203 to S205 are repeated. On the other hand, upon determining that the process of step S205 has been executed a predetermined number of times, in step S207, the control unit 200 estimates, based on the locus of the first point in the predetermined number of times of processes and the locus of the second point in the predetermined number of times of processes, the presence/absence of an intention of the following other vehicle 302 to give way.

Estimation of the presence/absence of an intention of the following other vehicle 302 to give way in step S207 will be described below.

Figure 7A:
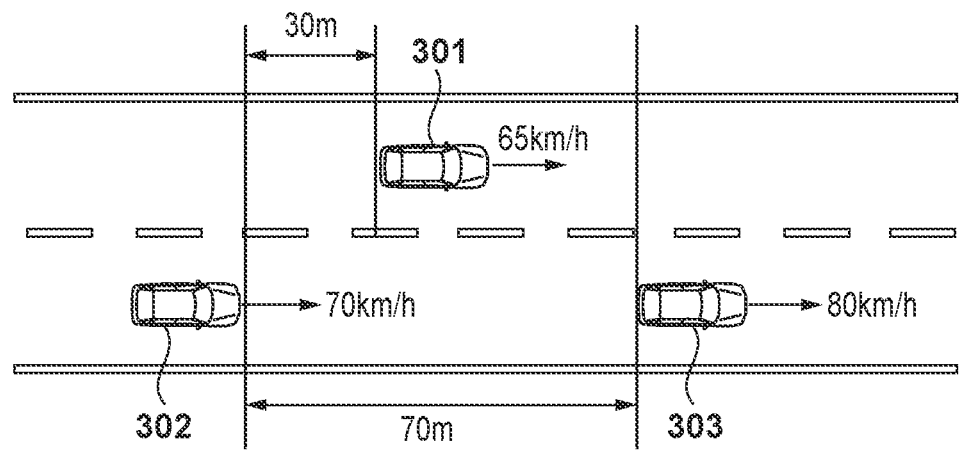
FIGS. 7A, 7B, and 7C are views for explaining intention estimation.
Figure 7B:
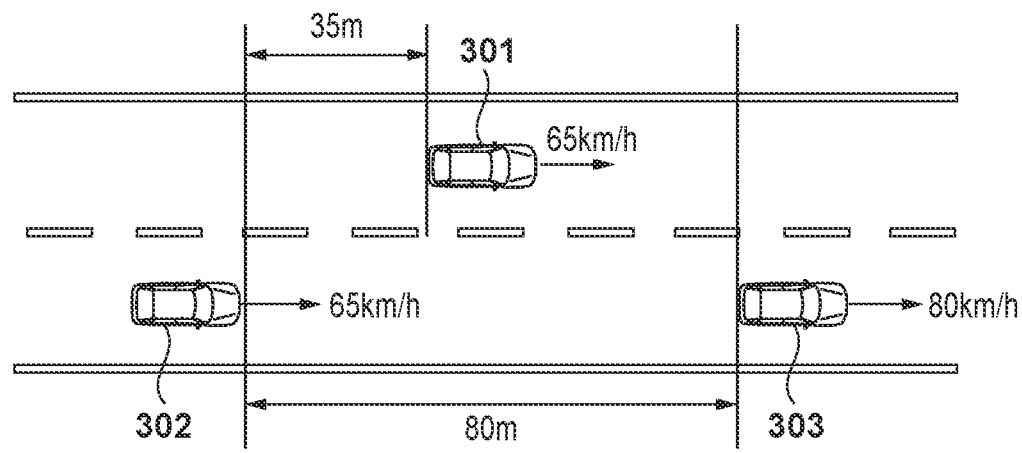
Figure 7C:
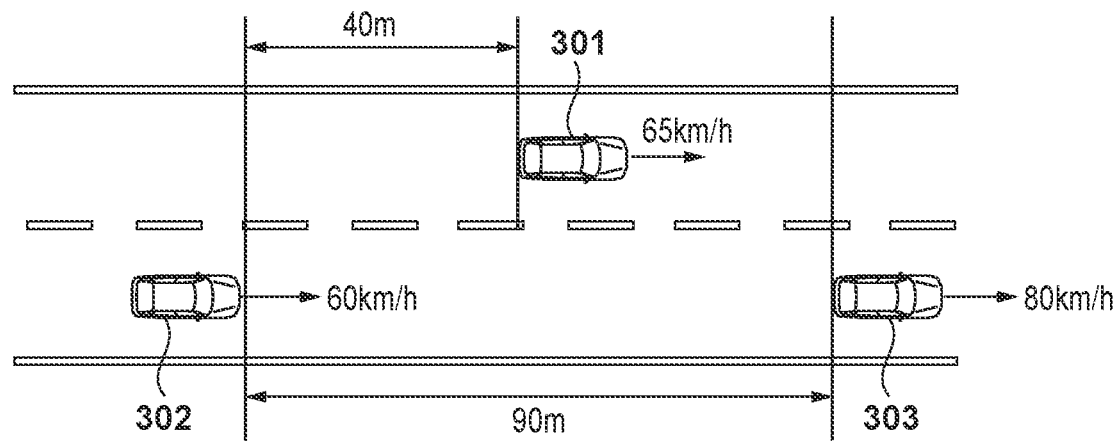

FIGS. 7A to 7C are views for explaining estimation of the presence/absence of an intention of the following other vehicle 302 to give way to the self-vehicle 301. After the generation of the acceleration/deceleration prediction map in step S202 of FIG. 5, when performing the first processes of steps S203 and S204, the self-vehicle 301, the preceding other vehicle 303, and the following other vehicle 302 are assumed to be traveling as shown in FIG. 7A. Note that the predetermined number of times of repeating the processes of steps S203 to S205 is three.

At this time, the relative speed between the self-vehicle 301 and the following other vehicle 302 is 65 km/h−70 km/h=−5 km/h. The inter-vehicle distance between the self-vehicle 301 and the following other vehicle 302 is 30 m. That is, the first point is plotted as indicated by a point 801 in FIG. 8A. On the other hand, the relative speed between the following other vehicle 302 and the preceding other vehicle 303 is 80 km/h−70 km/h=10 km/h. The inter-vehicle distance between the following other vehicle 302 and the preceding other vehicle 303 is 70 m. That is, the second point is plotted as indicated by a point 802 in FIG. 8A.

When performing the second processes of steps S203 and S204, the self-vehicle 301, the preceding other vehicle 303, and the following other vehicle 302 are assumed to be traveling as shown in FIG. 7B.

At this time, the relative speed between the self-vehicle 301 and the following other vehicle 302 is 65 km/h−65 km/h=0 km/h. The inter-vehicle distance between the self-vehicle 301 and the following other vehicle 302 is 35 m. That is, the first point is plotted as indicated by the point 801 in FIG. 8B. On the other hand, the relative speed between the following other vehicle 302 and the preceding other vehicle 303 is 80 km/h−65 km/h=+15 km/h. The inter-vehicle distance between the following other vehicle 302 and the preceding other vehicle 303 is 80 m. That is, the second point is plotted as indicated by the point 802 in FIG. 8B.

When performing the third processes of steps S203 and S204, the self-vehicle 301, the preceding other vehicle 303, and the following other vehicle 302 are assumed to be traveling as shown in FIG. 7C.

At this time, the relative speed between the self-vehicle 301 and the following other vehicle 302 is 65 km/h−60 km/h=+5 km/h. The inter-vehicle distance between the self-vehicle 301 and the following other vehicle 302 is 40 m. That is, the first point is plotted as indicated by the point 801 in FIG. 8C. On the other hand, the relative speed between the following other vehicle 302 and the preceding other vehicle 303 is 80 km/h−60 km/h=+20 km/h. The inter-vehicle distance between the following other vehicle 302 and the preceding other vehicle 303 is 90 m. That is, the second point is plotted as indicated by the point 802 in FIG. 8C.

Figure 8A:
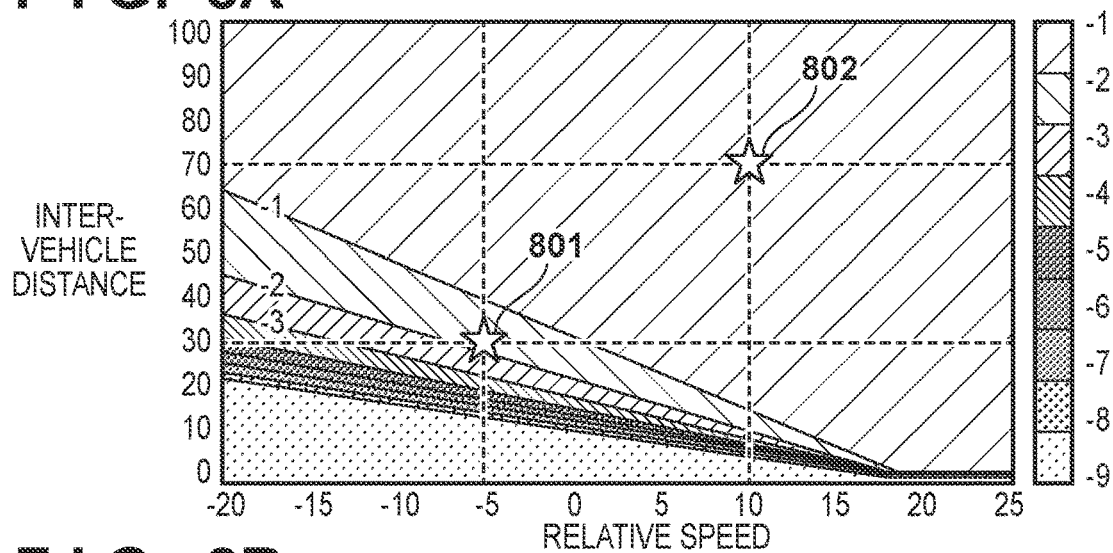
FIGS. 8A, 8B, and 8C are views for explaining intention estimation based on the acceleration/deceleration prediction map.
Figure 8B:
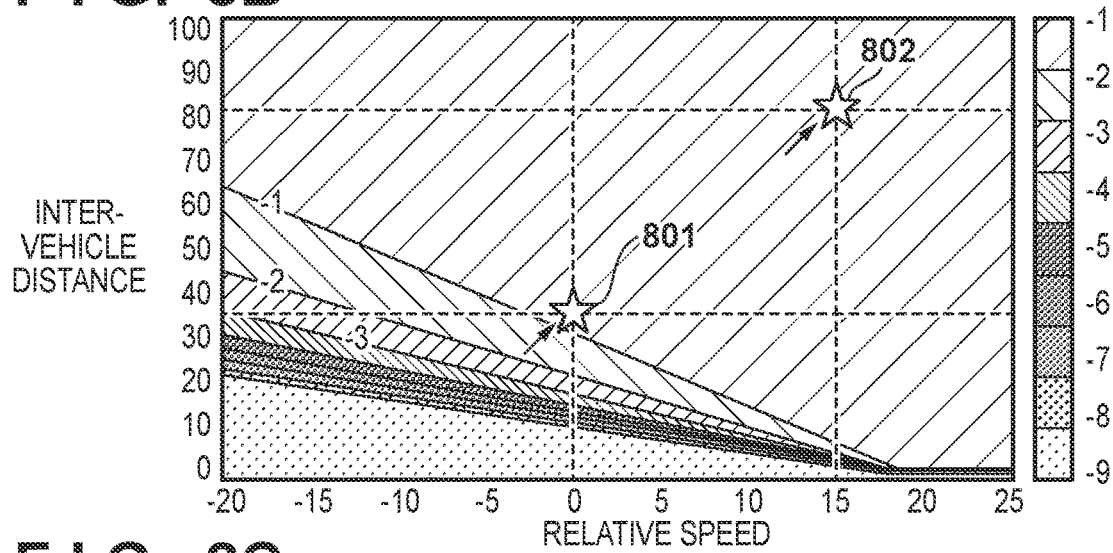
Figure 8C:
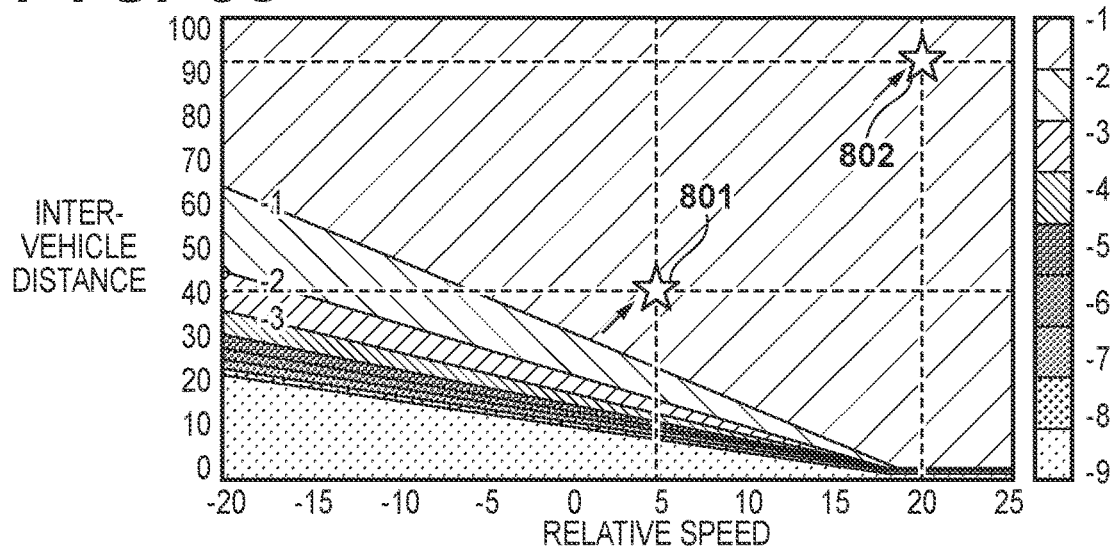

As shown in FIGS. 8A to 8C, focusing on the locus of the saved first point (point 801), it is found that the point gradually moves to the upper right side. The movement to the upper right side on the acceleration/deceleration prediction map indicates a tendency that both the relative speed and the inter-vehicle distance increase. In other words, it can be said that the movement to the upper right side on the acceleration/deceleration prediction map is a movement in a direction in which the acceleration/deceleration to a partner vehicle decreases. Focusing on the self-vehicle 301 and the following other vehicle 302, it is shown that the speed of the following other vehicle 302 becomes lower than the speed of the self-vehicle 301, and the inter-vehicle distance becomes long.

Focusing on the locus of the saved second point (point 802), as shown in FIGS. 8A to 8C, it is found that the point gradually moves to the upper right side. The movement to the upper right side on the acceleration/deceleration prediction map indicates a tendency that both the relative speed and the inter-vehicle distance increase. Focusing on the following other vehicle 302 and the preceding other vehicle 303, it is shown that the speed of the following other vehicle 302 becomes lower than the speed of the preceding other vehicle 303, and the inter-vehicle distance becomes long.

Based on the tendencies of the movements of the two points, the control unit 200 of the self-vehicle 301 estimates that the following other vehicle 302 has an intention to give way to the self-vehicle 301. As for the movements of the first point and the second point to the upper right side, which make it possible to estimate that there is an intention to give way, for example, a line near 45° based on the axes of the inter-vehicle distance and the relative speed may be defined as a predetermined moving line. The predetermined moving line may be defined based on the axes and the distribution of accelerations/decelerations. In addition, if the moving amounts of the points 801 and 802 on the moving line, that is, the moving amounts in the directions of arrows in FIGS. 8B and 8C are equal to or more than a threshold, it is determined that the points 801 and 802 have moved.

FIG. 9 is a view showing the association of the relative relationships (the relative distances and the relative speeds) between the self-vehicle 301 and the following other vehicle 302 and between the following other vehicle 302 and the preceding other vehicle 303 with an estimation result. The description made with reference to FIGS. 7A to 7C and FIGS. 8A to 8C corresponds to a row 901 in FIG. 9.

Focusing on the relationship between the following other vehicle 302 and the preceding other vehicle 303, a row 902 in FIG. 9 shows that the speed of the following other vehicle 302 becomes lower than the speed of the preceding other vehicle 303, and the inter-vehicle distance becomes long. From this tendency, there is a possibility that it can be estimated that the following other vehicle 302 has an intention to give way to the self-vehicle 301. However, focusing on the relationship between the self-vehicle 301 and the following other vehicle 302, it is shown that the speed of the following other vehicle 302 becomes higher than the speed of the self-vehicle 301, and the inter-vehicle distance becomes short. As a result, it is estimated in conclusion that the following other vehicle 302 has no intention to give way to the self-vehicle 301.

Furthermore, the row 902 shows that the relative distance between the following other vehicle 302 and the preceding other vehicle 303 is maintained, and the relative speed is also maintained. In this case, independently of the relationship between the self-vehicle 301 and the following other vehicle 302, for example, the driver of the following other vehicle 302 may not be aware of the self-vehicle 301. Hence, it is estimated in conclusion that the following other vehicle 302 has no intention to give way to the self-vehicle 301.

Focusing on the relationship between the self-vehicle 301 and the following other vehicle 302, a row 903 in FIG. 9 shows that the speed of the following other vehicle 302 becomes lower than the speed of the self-vehicle 301, and the inter-vehicle distance becomes long. From this tendency, there is a possibility that it can be estimated that the following other vehicle 302 has an intention to give way to the self-vehicle 301. However, focusing on the relationship between the following other vehicle 302 and the preceding other vehicle 303, it is shown that the speed of the following other vehicle 302 becomes higher than the speed of the preceding other vehicle 303, and the inter-vehicle distance becomes short. As a result, it is estimated in conclusion that the following other vehicle 302 has no intention to give way to the self-vehicle 301.

Furthermore, the row 903 shows that the relative distance between the following other vehicle 302 and the preceding other vehicle 303 is maintained, and the relative speed is also maintained. In this case, independently of the relationship between the self-vehicle 301 and the following other vehicle 302, for example, the driver of the following other vehicle 302 may not be aware of the self-vehicle 301. Hence, it is estimated in conclusion that the following other vehicle 302 has no intention to give way to the self-vehicle 301.

Focusing on the relationship between the following other vehicle 302 and the preceding other vehicle 303, a row 904 in FIG. 9 shows that the speed of the following other vehicle 302 becomes higher than the speed of the preceding other vehicle 303, and the inter-vehicle distance becomes short. In addition, focusing on the relationship between the self-vehicle 301 and the following other vehicle 302, it is shown that the speed of the following other vehicle 302 becomes higher than the speed of the self-vehicle 301, and the inter-vehicle distance becomes short. As a result, it is estimated in conclusion that the following other vehicle 302 has no intention to give way to the self-vehicle 301.

As described above, in this embodiment, the presence/absence of an intention of the following other vehicle 302 to give way is estimated based on the relative speed and the inter-vehicle distance between the self-vehicle 301 and the following other vehicle 302 and the relative speed and the inter-vehicle distance between the following other vehicle 302 and the preceding other vehicle 303. In an arrangement for estimating the intention from the behavior of the following other vehicle 302 by directly detecting the acceleration/deceleration of the following other vehicle 302, noise is readily superposed on the data of the acceleration/deceleration. However, according to the arrangement of this embodiment, since the intention of the following other vehicle 302 is estimated based on the behavior of the following other vehicle 302 to each of the preceding other vehicle 303 and the self-vehicle 301, the accuracy of intention estimation can be improved.

Additionally, in the above description, if the moving amounts in the directions of the arrows in FIGS. 8B and 8C are equal to or more than a threshold, it is determined that the points 801 and 802 have moved. The standard of intention estimation can be varied by changing the threshold. For example, as a result of determining the traveling scene of the vehicle 1, if the following other vehicle 302 is traveling at a relatively high speed, and is traveling not on a normal traveling lane but on a passing lane, the threshold is made larger. This makes it difficult to determine that the points 801 and 802 in FIGS. 8A to 8C have moved and also makes it difficult to estimate that the following other vehicle 302 has an intention to give way.

Figure 10:
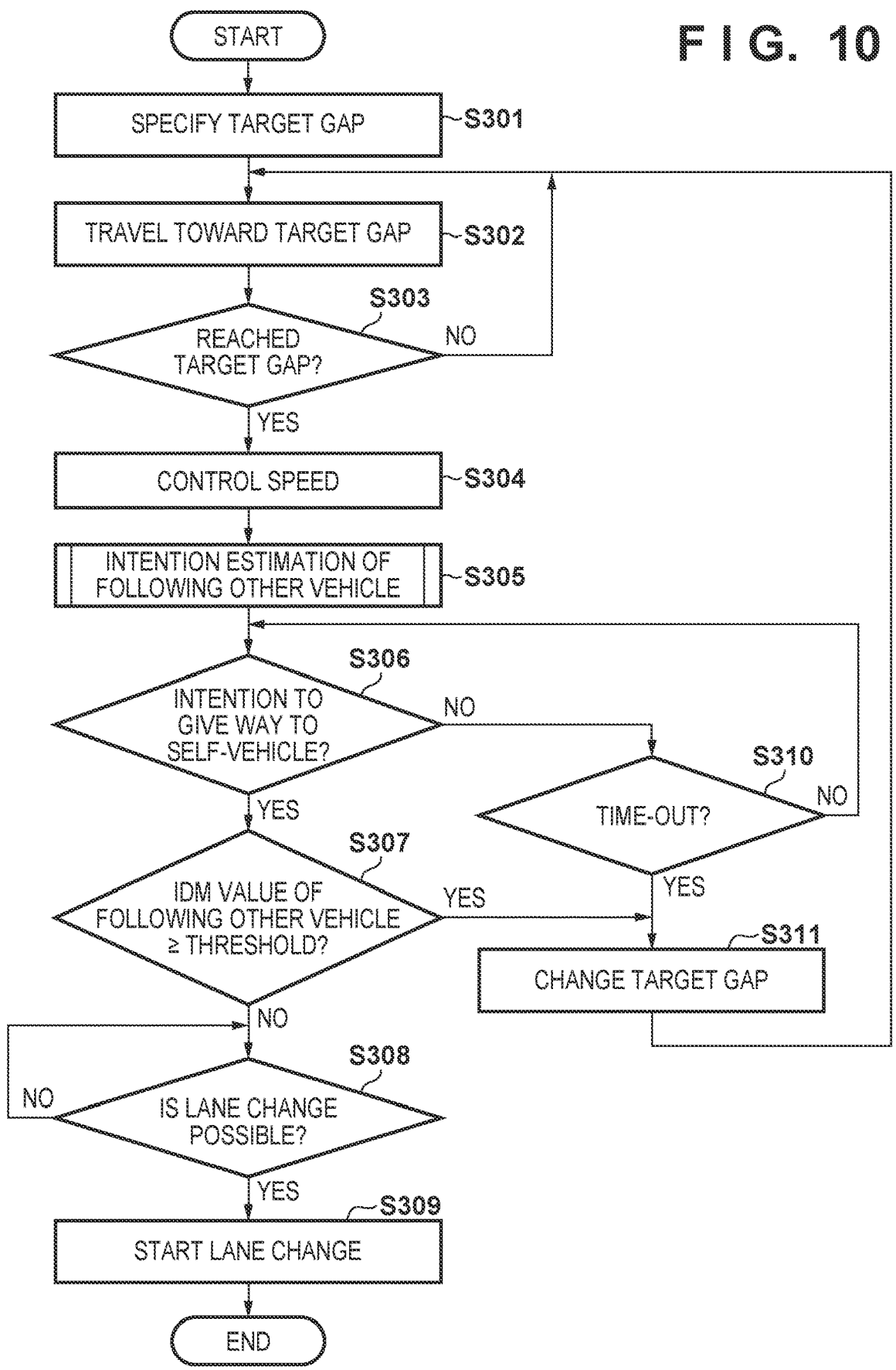
FIG. 10 is another flowchart showing processing of entering between vehicles by a lane change.

FIG. 10 is another flowchart showing processing of entering between vehicles by a lane change by the traveling control apparatus of the self-vehicle 301 according to this embodiment. Processing shown in FIG. 10 is implemented when, for example, the control unit 200 of the self-vehicle 301 reads out a program stored in a storage area such as a ROM and executes it. A description will be made below by referring to the control unit 200 of the self-vehicle 301 simply as the control unit 200 unless specified otherwise.

Steps S301 to S306 are the same as in the description concerning steps S101 to S106 of FIG. 4, and a description thereof will be omitted.

If it is estimated in step S306 that the following other vehicle 302 has no intention to give way to the self-vehicle 301, in step S310, the control unit 200 determines whether a predetermined time has elapsed, and a time-out has occurred. Upon determining that a time-out has not occurred, processing from step S305 is repeated. On the other hand, upon determining that a time-out has occurred, in step S311, the control unit 200 stops entering the gap currently set to the target, and specifies another target gap. When another target gap is specified, processing from step S302 is repeated.

On the other hand, if it is estimated in step S306 that the following other vehicle 302 has an intention to give way to the self-vehicle 301, in step S307, the control unit 200 determines whether an IDM value obtained based on the behavior of the following other vehicle 302 is equal to or more than a threshold. For example, the control unit 200 determines whether the absolute value of the acceleration/deceleration value saved in step S205 is equal to or more than a threshold. Upon determining in step S307 that the IDM value is equal to or more than a threshold, it is judged that the effect that the self-vehicle 301 exerts on the following other vehicle 302 by entering between the vehicles is large, and the process advances to step S311 without entering between the vehicles.

Upon determining in step S307 that the IDM value is not equal to or more than a threshold, in step S308, the control unit 200 monitors a timing at which a lane change is possible. Upon determining that a lane change is possible, in step S309, the control unit 200 starts a lane change to enter the target gap. After that, the processing shown in FIG. 10 is ended.

As described above, according to the processing shown in FIG. 10, even in a case in which it is estimated that the following other vehicle 302 has an intention to give way, if the influence on the following other vehicle 302, for example, if the acceleration/deceleration caused in the following other vehicle 302 is equal to or more than a threshold, entering between the vehicles is not performed. With this arrangement, the influence on the other vehicle can be reduced.

Figure 11:
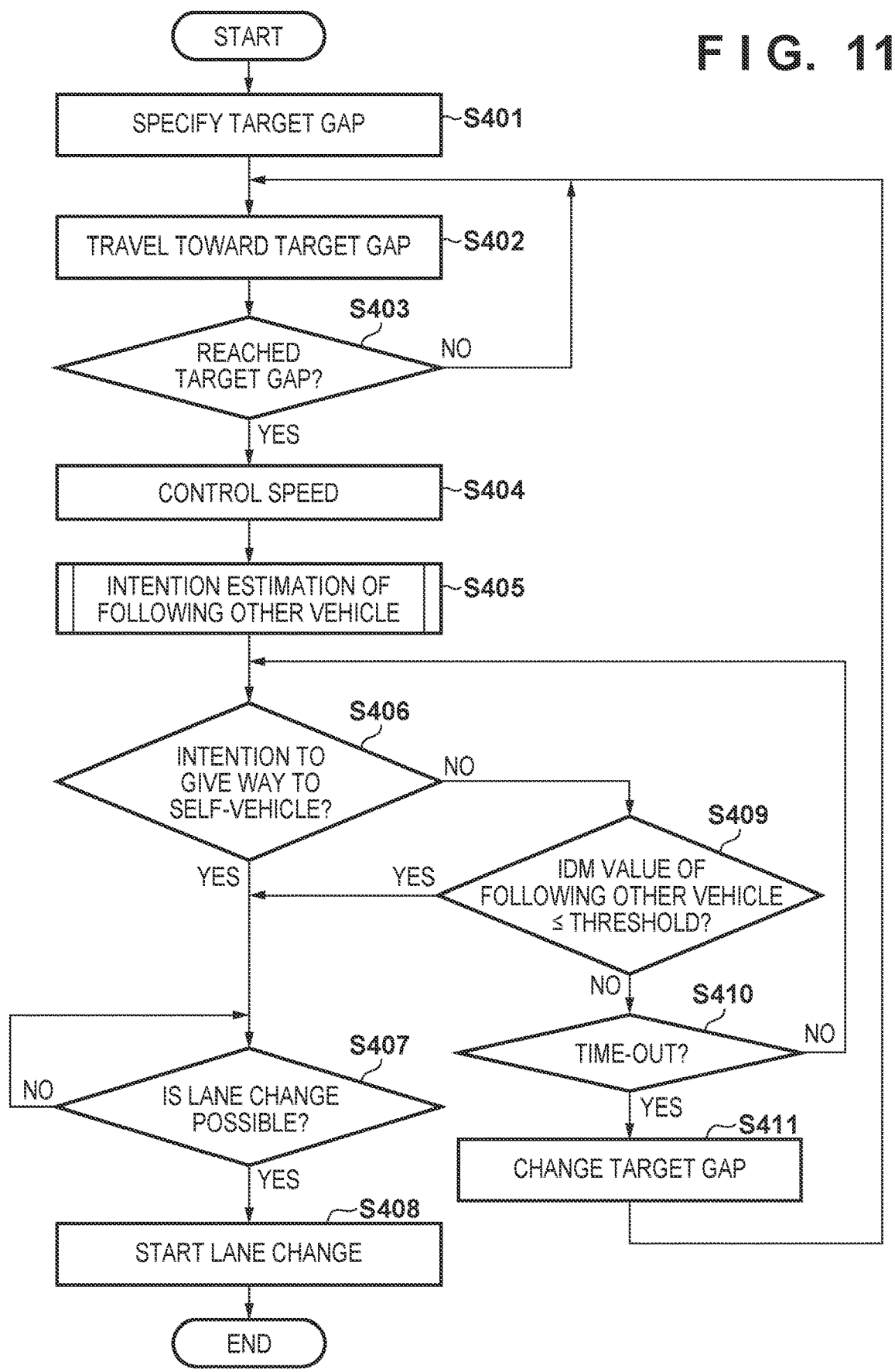
FIG. 11 is still another flowchart showing processing of entering between vehicles by a lane change.

FIG. 11 is still another flowchart showing processing of entering between vehicles by a lane change by the traveling control apparatus of the self-vehicle 301 according to this embodiment. Processing shown in FIG. 11 is implemented when, for example, the control unit 200 of the self-vehicle 301 reads out a program stored in a storage area such as a ROM and executes it. A description will be made below by referring to the control unit 200 of the self-vehicle 301 simply as the control unit 200 unless specified otherwise.

Steps S401 to S406 are the same as in the description concerning steps S101 to S106 of FIG. 4, and a description thereof will be omitted.

If it is estimated in step S406 that the following other vehicle 302 has an intention to give way to the self-vehicle 301, in step S407, the control unit 200 monitors a timing at which a lane change is possible. Upon determining that a lane change is possible, in step S408, the control unit 200 starts a lane change to enter the target gap. After that, the processing shown in FIG. 11 is ended.

On the other hand, if it is estimated in step S406 that the following other vehicle 302 has no intention to give way to the self-vehicle 301, in step S409, the control unit 200 determines whether an IDM value obtained based on the behavior of the following other vehicle 302 is equal to or less than a threshold. For example, the control unit 200 determines whether the absolute value of the acceleration/deceleration value saved in step S205 is equal to or less than a threshold. Upon determining in step S409 that the IDM value is equal to or less than a threshold, it is judged that the effect that the self-vehicle 301 exerts on the following other vehicle 302 by entering between the vehicles is small, and the process advances to step S407 to enter between the vehicles.

Upon determining in step S409 that the IDM value is not equal to or less than a threshold, in step S410, the control unit 200 determines whether a predetermined time has elapsed, and a time-out has occurred. Upon determining that a time-out has not occurred, processing from step S405 is repeated. On the other hand, upon determining that a time-out has occurred, in step S411, the control unit 200 stops entering the gap currently set to the target, and specifies another target gap. When another target gap is specified, processing from step S402 is repeated.

As described above, according to the processing shown in FIG. 11, even in a case in which it is estimated that the following other vehicle 302 has no intention to give way, if the influence on the following other vehicle 302, for example, if the acceleration/deceleration caused in the following other vehicle 302 is equal to or less than a threshold, entering between the vehicles is performed. With this arrangement, it is possible to increase opportunities to enter between vehicles and further smoothen the whole vehicle traveling. The processes shown in FIGS. 10 and 11 have been described above as separate processes. However, FIGS. 10 and 11 may be combined, and the processes described with reference to FIGS. 10 and 11 may be performed in the branch destinations of steps S306 and S406.

A case in which the preceding other vehicle 303 has disappeared in the middle of processing of entering between vehicles by a lane change of the self-vehicle 301, which has been described with reference to FIG. 4 or the like, will be described below.

Figure 12:
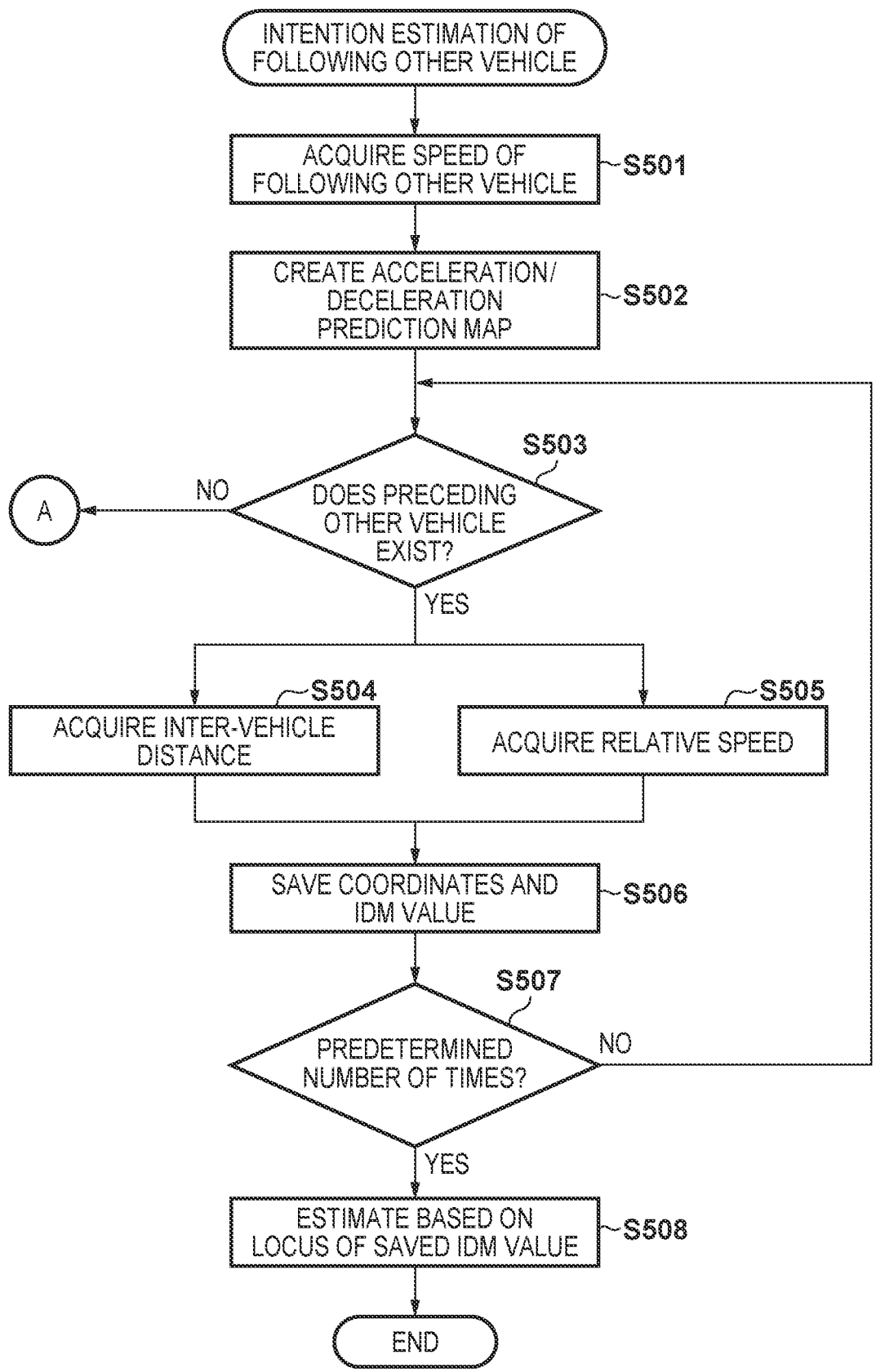
FIG. 12 is another flowchart showing processing of intention estimation.

FIG. 12 is a flowchart showing processing in a case in which the preceding other vehicle 303 has disappeared in the middle of processing of entering between vehicles by a lane change of the self-vehicle 301. Here, the case in which the preceding other vehicle 303 has disappeared is, for example, a case in which the preceding other vehicle 303 has moved out of a predetermined range or a case in which the preceding other vehicle 303 has disappeared due to branch or the like. Processing shown in FIG. 12 is implemented when, for example, the control unit 200 of the self-vehicle 301 reads out a program stored in a storage area such as a ROM and executes it. A description will be made below by referring to the control unit 200 of the self-vehicle 301 simply as the control unit 200 unless specified otherwise.

Steps S501 and S502 are the same as in the description concerning steps S201 and S202 of FIG. 5, and a description thereof will be omitted.

In step S503, the control unit 200 determines whether the preceding other vehicle 303 exists. Upon determining that the preceding other vehicle 303 exists, the processes of steps S504 to S508 are performed. The processes of steps S504 to S508 are the same as in the description concerning steps S203 to S207 of FIG. 5, and a description thereof will be omitted. On the other hand, a case in which it is determined that the preceding other vehicle 303 does not exist will be described with reference to FIG. 13.

The case in which it is determined in step S503 of FIG. 12 that the preceding other vehicle 303 does not exist is, for example, a case in which the preceding other vehicle 303 does not exist in a region that can be judged as the inter-vehicle distance S1 in FIG. 3 due to right turn, stop on a road shoulder, rapid acceleration to the front side, or the like of the preceding other vehicle 303. The region that can be judged as the inter-vehicle distance S1 can arbitrarily be defined. For example, it may be a distance obtained by adding a predetermined distance to the recommended inter-vehicle distance S1.

Upon determining in step S503 of FIG. 12 that the preceding other vehicle 303 does not exist, in step S601 of FIG. 13, the control unit 200 determines whether a second preceding other vehicle has been detected. Here, the second preceding other vehicle is another vehicle traveling ahead of the following other vehicle 302 on the same traveling lane as the following other vehicle 302. Here, the detection range of the second preceding other vehicle is a distance longer than the inter-vehicle distance S1 shown in FIG. 3.

Upon determining in step S601 that a second preceding other vehicle has been detected, the processes shown in FIGS. 12 and 13 are ended. After the end of the processes shown in FIGS. 12 and 13, for example, a gap on the front side of the detected second preceding other vehicle may be specified as a new target gap, and the processing shown in FIG. 4 may be executed.

Upon determining in step S601 that a second preceding other vehicle has not been detected, the process advances to step S602. In step S602, the control unit 200 determines a change in the speed of the following other vehicle 302. Upon determining that the speed of the following other vehicle 302 is increasing, in step S603, the control unit 200 estimates that the following other vehicle 302 has no intention to give way to the self-vehicle 301. After that, the processes shown in FIGS. 12 and 13 are ended.

Upon determining in step S602 that the speed of the following other vehicle 302 is maintained, in step S605, the control unit 200 determines whether the inter-vehicle distance between the self-vehicle 301 and the following other vehicle 302 is sufficient to enter between the vehicles. Upon determining that the inter-vehicle distance is sufficient to enter between the vehicles, in step S606, the control unit 200 starts a lane change. After that, the processes shown in FIGS. 12 and 13 are ended. On the other hand, upon determining that the inter-vehicle distance is not sufficient to enter between the vehicles, the process advances to step S607. The case in which it is determined that the inter-vehicle distance is not sufficient to enter between the vehicles is, for example, a case in which the following other vehicle 302 has decreased the inter-vehicle distance S2 during the process of step S503 or S601. In this case, in step S607, the control unit 200 determines whether the process of step S605 has been repeated a predetermined number of times. Upon determining that the process has not been repeated a predetermined number of times, processing from step S602 is repeated. Upon determining that the process has been repeated a predetermined number of times, it is estimated that the following other vehicle 302 has no intention to give way to the self-vehicle 301. After that, the processes shown in FIGS. 12 and 13 are ended.

Upon determining in step S602 that the speed of the following other vehicle 302 is decreasing, in step S604, the control unit 200 estimates that the following other vehicle 302 has an intention to give way to the self-vehicle, and the process advances to step S606.

As described above, according to the processes shown in FIGS. 12 and 13, if the preceding other vehicle 303 has disappeared, the presence/absence of the intention to give way to the self-vehicle 301 is estimated in accordance with the behavior of the following other vehicle 302 to the self-vehicle 301. If the preceding other vehicle 303 exists, the presence/absence of an intention of the following other vehicle 302 to give way is preferentially estimated based on the relative speed and the inter-vehicle distance between the self-vehicle 301 and the following other vehicle 302 and the relative speed and the inter-vehicle distance between the following other vehicle 302 and the preceding other vehicle 303, as described with reference to FIGS. 4, 5, 10, and 11.

Summary of Embodiment

A traveling control apparatus according to this embodiment comprises an acquisition unit configured to acquire information outside a vehicle (outside recognition camera 207, outside recognition sensor 208), a control unit configured to control traveling of the vehicle based on the information outside the vehicle, which is acquired by the acquisition unit (control unit 200), and an estimation unit configured to, if the acquisition unit acquires, as the information outside the vehicle, information of a following other vehicle that is a vehicle traveling on a lane different from a traveling lane of the vehicle and is traveling behind the vehicle and information of a preceding other vehicle that is traveling ahead the vehicle and the following other vehicle, estimate, based on a behavior of the following other vehicle to the preceding other vehicle and a behavior of the following other vehicle to the vehicle, whether the behavior of the following other vehicle allows a lane change of the vehicle to enter between the preceding other vehicle and the following other vehicle (control unit 200, FIG. 5).

With this arrangement, it is possible to estimate the presence/absence of an intention of the following other vehicle to give way to the self-vehicle.

Additionally, the estimation unit estimates, based on information representing a relative relationship between the following other vehicle and the preceding other vehicle and information representing a relative relationship between the following other vehicle and the vehicle, whether the behavior of the following other vehicle allows the lane change of the vehicle to enter between the preceding other vehicle and the following other vehicle. In addition, the information representing the relative relationship includes an inter-vehicle distance and a relative speed, and the behavior of the following other vehicle includes moving close to one of the vehicle and the preceding other vehicle and moving away from one of the vehicle and the preceding other vehicle.

With this arrangement, it is possible to estimate, based on the relative relationships between the following other vehicle and the preceding other vehicle and between the following other vehicle and the self-vehicle, the presence/absence of an intention of the following other vehicle to give way to the self-vehicle.

Also, if the inter-vehicle distance and the relative speed between the following other vehicle and the preceding other vehicle decrease, and the inter-vehicle distance and the relative speed between the following other vehicle and the vehicle increase, the estimation unit estimates that the behavior of the following other vehicle does not allow the lane change of the vehicle. If the inter-vehicle distance and the relative speed between the following other vehicle and the preceding other vehicle increase, and the inter-vehicle distance and the relative speed between the following other vehicle and the vehicle decrease, the estimation unit estimates that the behavior of the following other vehicle does not allow the lane change of the vehicle. If the inter-vehicle distance and the relative speed between the following other vehicle and the preceding other vehicle is maintained, and the inter-vehicle distance and the relative speed between the following other vehicle and the vehicle is maintained, the estimation unit estimates that the behavior of the following other vehicle does not allow the lane change of the vehicle.

With this arrangement, it is possible to appropriately estimate the presence/absence of an intention of the following other vehicle to give way to the self-vehicle using the inter-vehicle distance and the relative speed between the following other vehicle and the preceding other vehicle and those between the following other vehicle and the self-vehicle.

Additionally, if the estimation unit estimates that the lane change of the vehicle to enter between the preceding other vehicle and the following other vehicle is allowed, the control unit controls the traveling of the vehicle to perform the lane change, and if the estimation unit estimates that the lane change of the vehicle to enter between the preceding other vehicle and the following other vehicle is not allowed, the control unit controls the traveling of the vehicle not to perform the lane change.

With this arrangement, it is possible to perform traveling control for a lane change based on the result of estimating the presence/absence of an intention of the following other vehicle to give way to the self-vehicle.

Also, even in a case in which the estimation unit estimates that the behavior of the following other vehicle does not allow the lane change of the vehicle, if a magnitude of an acceleration/deceleration caused in the following other vehicle is not more than a threshold, the control unit controls the traveling of the vehicle to perform the lane change to enter between the preceding other vehicle and the following other vehicle (FIG. 11). Even in a case in which the estimation unit estimates that the behavior of the following other vehicle allows the lane change of the vehicle, if a magnitude of an acceleration/deceleration caused in the following other vehicle is not less than a threshold, the control unit controls the traveling of the vehicle not to perform the lane change to enter between the preceding other vehicle and the following other vehicle (FIG. 10).

With this arrangement, it is possible to perform traveling control for a lane change in accordance with the influence on the following other vehicle.

The traveling control apparatus further comprises a second estimation unit configured to estimate, based on a speed of the following other vehicle, whether the behavior of the following other vehicle allows the lane change of the vehicle in place of the estimation by the estimation unit in a case in which the preceding other vehicle has disappeared (FIG. 13).

With this arrangement, in a case in which the preceding other vehicle has disappeared, it is possible to estimate, based on the speed of the following other vehicle, the presence/absence of an intention of the following other vehicle to give way to the self-vehicle.

Furthermore, the acquisition unit acquires the information of the following other vehicle that is the vehicle traveling on the lane different from the traveling lane of the vehicle and is traveling behind the vehicle and the information of the preceding other vehicle that is traveling ahead the vehicle and the following other vehicle if a notification by a direction indicator of the vehicle has been made.

With this arrangement, it is possible to estimate, by the operation of the turn signal, the presence/absence of an intention of the following other vehicle to give way to the self-vehicle.

The invention is not limited to the foregoing embodiments, and various variations/changes are possible within the spirit of the invention.

What is claimed is:

1. A traveling control apparatus comprising:
   an acquisition unit configured to acquire information outside a vehicle;
   a control unit configured to control traveling of the vehicle based on the information outside the vehicle, which is acquired by the acquisition unit; and
   an estimation unit configured to, if the acquisition unit acquires, as the information outside the vehicle, information of a following other vehicle that is a vehicle traveling on a lane different from a traveling lane of the vehicle and is traveling behind the vehicle and information of a preceding other vehicle that is traveling ahead the vehicle and the following other vehicle, estimate, based on a behavior of the following other vehicle to the preceding other vehicle and a behavior of the following other vehicle to the vehicle, whether the behavior of the following other vehicle allows a lane change of the vehicle to enter between the preceding other vehicle and the following other vehicle;
   wherein the estimation unit estimates, based on information representing a relative relationship between the following other vehicle and the preceding other vehicle and information representing a relative relationship between the following other vehicle and the vehicle, whether the behavior of the following other vehicle allows the lane change of the vehicle to enter between the preceding other vehicle and the following other vehicle; and
   wherein the information representing the relative relationship includes an inter-vehicle distance and a relative speed, and the behavior of the following other vehicle includes moving close to one of the vehicle and the preceding other vehicle and moving away from one of the vehicle and the preceding other vehicle.

2. The apparatus according to claim 1, wherein if the inter-vehicle distance and the relative speed between the following other vehicle and the preceding other vehicle decrease, and the inter-vehicle distance and the relative speed between the following other vehicle and the vehicle increase, the estimation unit estimates that the behavior of the following other vehicle does not allow the lane change of the vehicle.

3. The apparatus according to claim 1, wherein if the inter-vehicle distance and the relative speed between the following other vehicle and the preceding other vehicle increase, and the inter-vehicle distance and the relative speed between the following other vehicle and the vehicle decrease, the estimation unit estimates that the behavior of the following other vehicle does not allow the lane change of the vehicle.

4. The apparatus according to claim 1, wherein if the inter-vehicle distance and the relative speed between the following other vehicle and the preceding other vehicle is maintained, and the inter-vehicle distance and the relative speed between the following other vehicle and the vehicle is maintained, the estimation unit estimates that the behavior of the following other vehicle does not allow the lane change of the vehicle.

5. The apparatus according to claim 1, wherein if the estimation unit estimates that the lane change of the vehicle to enter between the preceding other vehicle and the following other vehicle is allowed, the control unit controls the traveling of the vehicle to perform the lane change, and if the estimation unit estimates that the lane change of the vehicle to enter between the preceding other vehicle and the following other vehicle is not allowed, the control unit controls the traveling of the vehicle not to perform the lane change.

6. The apparatus according to claim 5, wherein even in a case in which the estimation unit estimates that the behavior of the following other vehicle does not allow the lane change of the vehicle, if a magnitude of an acceleration/deceleration caused in the following other vehicle is not more than a threshold, the control unit controls the traveling of the vehicle to perform the lane change to enter between the preceding other vehicle and the following other vehicle.

7. The apparatus according to claim 5, wherein even in a case in which the estimation unit estimates that the behavior of the following other vehicle allows the lane change of the vehicle, if a magnitude of an acceleration/deceleration caused in the following other vehicle is not less than a threshold, the control unit controls the traveling of the vehicle not to perform the lane change to enter between the preceding other vehicle and the following other vehicle.

8. The apparatus according to claim 1, further comprising a second estimation unit configured to estimate, based on a speed of the following other vehicle, whether the behavior of the following other vehicle allows the lane change of the vehicle in place of the estimation by the estimation unit in a case in which the preceding other vehicle has disappeared.

9. The apparatus according to claim 1, wherein the acquisition unit acquires the information of the following other vehicle that is the vehicle traveling on the lane different from the traveling lane of the vehicle and is traveling behind the vehicle and the information of the preceding other vehicle that is traveling ahead the vehicle and the following other vehicle if a notification by a direction indicator of the vehicle has been made.

10. A traveling control method executed by a traveling control apparatus, comprising:
   acquiring information outside a vehicle;
   controlling traveling of the vehicle based on the acquired information outside the vehicle; and
   if information of a following other vehicle that is a vehicle traveling on a lane different from a traveling lane of the vehicle and is traveling behind the vehicle and information of a preceding other vehicle that is traveling ahead the vehicle and the following other vehicle are acquired as the information outside the vehicle, estimating, based on a behavior of the following other vehicle to the preceding other vehicle and a behavior of the following other vehicle to the vehicle, whether the behavior of the following other vehicle allows a lane change of the vehicle to enter between the preceding other vehicle and the following other vehicle;
   wherein the estimating further comprises estimating, based on information representing a relative relationship between the following other vehicle and the preceding other vehicle and information representing a relative relationship between the following other vehicle and the vehicle, whether the behavior of the following other vehicle allows the lane change of the vehicle to enter between the preceding other vehicle and the following other vehicle; and
   wherein the information representing the relative relationship includes an inter-vehicle distance and a relative speed, and the behavior of the following other vehicle includes moving close to one of the vehicle and the preceding other vehicle and moving away from one of the vehicle and the preceding other vehicle.

11. A non-transitory computer-readable storage medium storing a program configured to cause a computer to function to:
   acquire information outside a vehicle;
   control traveling of the vehicle based on the acquired information outside the vehicle; and
   if information of a following other vehicle that is a vehicle traveling on a lane different from a traveling lane of the vehicle and is traveling behind the vehicle and information of a preceding other vehicle that is traveling ahead the vehicle and the following other vehicle are acquired as the information outside the vehicle, estimate, based on a behavior of the following other vehicle to the preceding other vehicle and a behavior of the following other vehicle to the vehicle, whether the behavior of the following other vehicle allows a lane change of the vehicle to enter between the preceding other vehicle and the following other vehicle;
   wherein the program configured to cause the computer to function to estimate further comprises causing the computer to function to estimate, based on information representing a relative relationship between the following other vehicle and the preceding other vehicle and information representing a relative relationship between the following other vehicle and the vehicle, whether the behavior of the following other vehicle allows the lane change of the vehicle to enter between the preceding other vehicle and the following other vehicle; and
   wherein the information representing the relative relationship includes an inter-vehicle distance and a relative speed, and the behavior of the following other vehicle includes moving close to one of the vehicle and the preceding other vehicle and moving away from one of the vehicle and the preceding other vehicle.

* * * * *